US012651151B2

(12) United States Patent
Hou et al.

(10) Patent No.:     US 12,651,151 B2
(45) Date of Patent:          Jun. 9, 2026

(54) METHOD OF OPERATING MEMORY-BASED DEVICE

(71) Applicants: TAIWAN SEMICONDUCTOR MANUFACTURING CO., LTD., Hsinchu (TW); NATIONAL YANG MING CHIAO TUNG UNIVERSITY, Hsinchu City (TW)

(72) Inventors: Tuo-Hung Hou, Hsinchu City (TW); Chih-Cheng Chang, Taipei City (TW)

(73) Assignees: TAIWAN SEMICONDUCTOR MANUFACTURING CO., LTD., Hsinchu (TW); NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 763 days.

(21) Appl. No.: 17/962,768

(22) Filed: Oct. 10, 2022

(65) Prior Publication Data

US 2023/0042789 A1     Feb. 9, 2023

Related U.S. Application Data

(63) Continuation of application No. 16/162,582, filed on Oct. 17, 2018, now Pat. No. 11,494,619.

(60) Provisional application No. 62/592,772, filed on Nov. 30, 2017.

(51) Int. Cl.
*G06N 3/063* (2023.01)
*G06F 18/243* (2023.01)
*G06N 3/06* (2006.01)
*G06V 30/414* (2022.01)

(52) U.S. Cl.
CPC ....... *G06N 3/063* (2013.01); *G06F 18/24317* (2023.01); *G06N 3/061* (2013.01); *G06V 30/414* (2022.01)

(58) Field of Classification Search
CPC .. G06N 3/063; G06N 3/061; G06F 18/24317; G06V 30/414
See application file for complete search history.

(56) References Cited

U.S. PATENT DOCUMENTS

| | | | |
|---|---|---|---|
| 11,055,608 B2 | 7/2021 | Bichler | |
| 2015/0269483 A1* | 9/2015 | Nishitani | G06N 3/065 |
| | | | 706/25 |
| 2015/0339570 A1 | 11/2015 | Scheffler | |
| 2018/0174025 A1 | 6/2018 | Jin | |
| 2018/0225567 A1* | 8/2018 | Bedell | G06N 3/04 |
| 2019/0122105 A1 | 4/2019 | Boybat Kara et al. | |
| 2019/0164046 A1* | 5/2019 | Song | G11C 11/54 |

(Continued)

OTHER PUBLICATIONS

S. Yu et.al., "Scaling-up resistive synaptic arrays for neuro-inspired architecture: challenges and prospect," in Proc. IEEE Int. Electron Devices Meeting (IEDM), 2015, pp. 451-454.

(Continued)

*Primary Examiner* — Michael Alsip
(74) *Attorney, Agent, or Firm* — Maschoff Brennan

(57) ABSTRACT

A method includes: generating a first sum value at least by a first resistor; generating a first shifted sum value based on the first sum value and a nonlinear function; generating a pulse number based on the first shifted sum value; and changing the first resistor based on the pulse number to adjust the first sum value.

20 Claims, 9 Drawing Sheets

(56)  References Cited

U.S. PATENT DOCUMENTS

2020/0110991  A1     4/2020  Kataeva et al.
2021/0019609  A1     1/2021  Strukov et al.

OTHER PUBLICATIONS

G. W. Burr et.al., "Experimental demonstration and tolerancing of a large-scale neural network (165,000 synapses), using phase-change memory as the synaptic weight element," in Proc. IEEE Int. Electron Devices Meeting (IEDM), 2014, pp. 697-700.
J. Woo et.al., "Improved synaptic behavior under identical pulses using AlOx/HfO2 bilayer RRAM array for neuromorphic systems," IEEE Electron Device Lett., vol. 37, No. 8, pp. 994-997, 2016.
D. Lee et.al., "Oxide based nanoscale analog synapse device for neural signal recognition system," in Proc. IEEE Int. Electron Devices Meeting (IEDM), 2015, pp. 91-94.
I.-T. Wang et.al., "3D Ta/TaOx/TiO2/Ti synaptic array and linearity tuning of weight update for hardware neural network applications," Nanotechnology, vol. 27, 365204, 2016.
Chih-Cheng Chang et.al., "Mitigating Asymmetric Nonlinear Weight Update Effects in Hardware Neural Network based on Analog Resistive Synapse", IEEE Circuits and Systems Society, Nov. 9, 2017.

\* cited by examiner

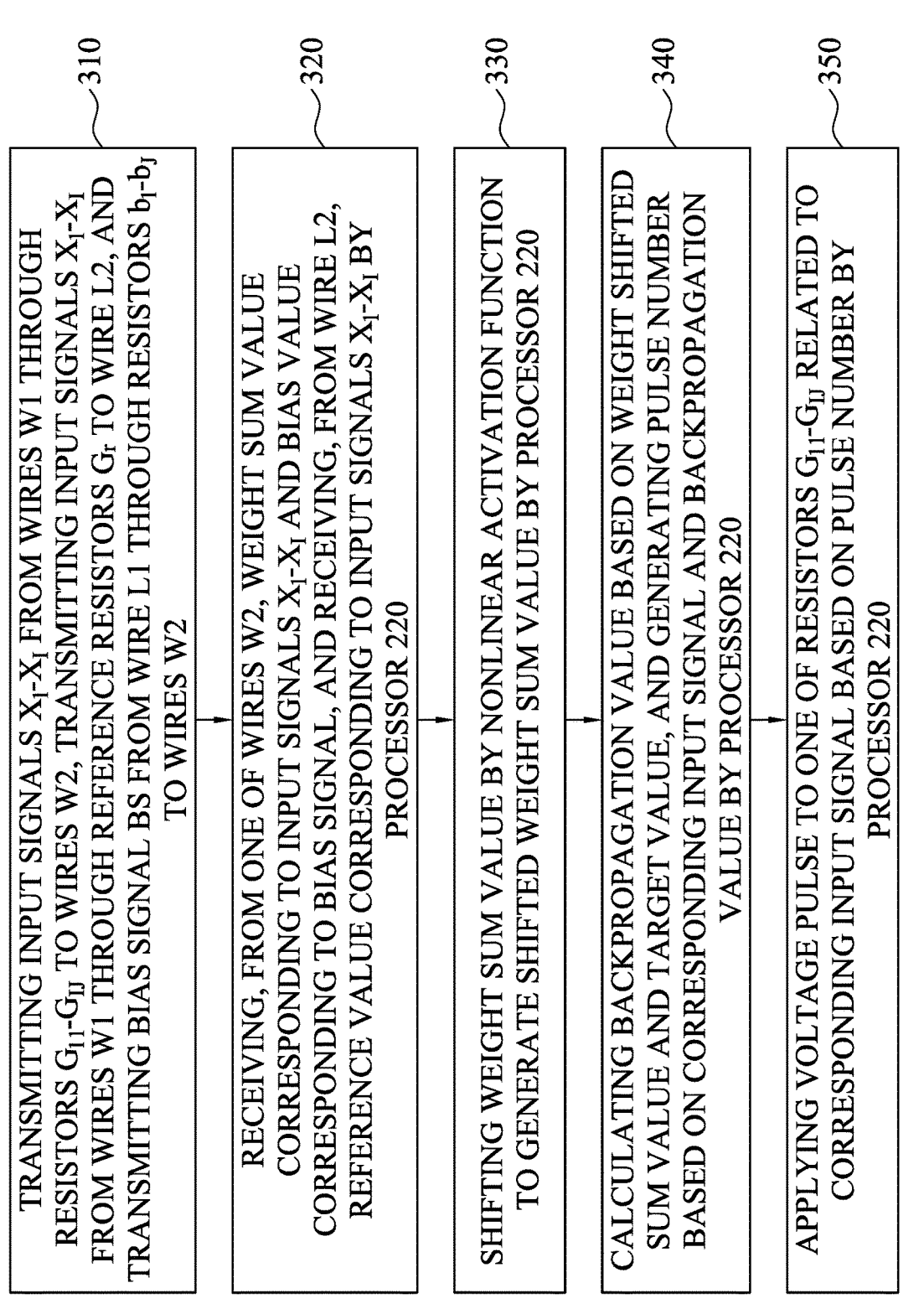

TRANSMITTING INPUT SIGNALS $X_1$-$X_I$ FROM WIRES W1 THROUGH RESISTORS $G_{11}$-$G_{IJ}$ TO WIRES W2, TRANSMITTING INPUT SIGNALS $X_1$-$X_I$ FROM WIRES W1 THROUGH REFERENCE RESISTORS $G_r$ TO WIRE L2, AND TRANSMITTING BIAS SIGNAL BS FROM WIRE L1 THROUGH RESISTORS $b_1$-$b_J$ TO WIRES W2

310

RECEIVING, FROM ONE OF WIRES W2, WEIGHT SUM VALUE CORRESPONDING TO INPUT SIGNALS $X_1$-$X_I$ AND BIAS VALUE CORRESPONDING TO BIAS SIGNAL, AND RECEIVING, FROM WIRE L2, REFERENCE VALUE CORRESPONDING TO INPUT SIGNALS $X_1$-$X_I$ BY PROCESSOR 220

320

SHIFTING WEIGHT SUM VALUE BY NONLINEAR ACTIVATION FUNCTION TO GENERATE SHIFTED WEIGHT SUM VALUE BY PROCESSOR 220

330

CALCULATING BACKPROPAGATION VALUE BASED ON WEIGHT SHIFTED SUM VALUE AND TARGET VALUE, AND GENERATING PULSE NUMBER BASED ON CORRESPONDING INPUT SIGNAL AND BACKPROPAGATION VALUE BY PROCESSOR 220

340

APPLYING VOLTAGE PULSE TO ONE OF RESISTORS $G_{11}$-$G_{IJ}$ RELATED TO CORRESPONDING INPUT SIGNAL BASED ON PULSE NUMBER BY PROCESSOR 220

METHOD OF OPERATING MEMORY-BASED DEVICE

RELATED APPLICATIONS

The present application is a continuation application of U.S. application Ser. No. 16/162,582, filed on Oct. 17, 2018, which claims priority to U.S. Provisional Application Ser. No. 62/592,772, filed Nov. 30, 2017, which is herein incorporated by reference.

BACKGROUND

In software-defined neural networks (NN), the weight update is computed precisely through mathematical equations, and the value of the weight update is then stored in digital memories. In hardware neural networks (HNNs), the weight update is directly computed and stored in synapses according to the effective number of pulses that one synapse receives during weight update. The weight state of an RRAM-based (Resistive Random Access Memory, RRAM) synapse has limited precision and is bounded. Furthermore, the weight update is asymmetric and nonlinear.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is an operation flow of the hardware neural network device in FIG. 2A, in accordance with various embodiments.

DETAILED DESCRIPTION

Figure 1:
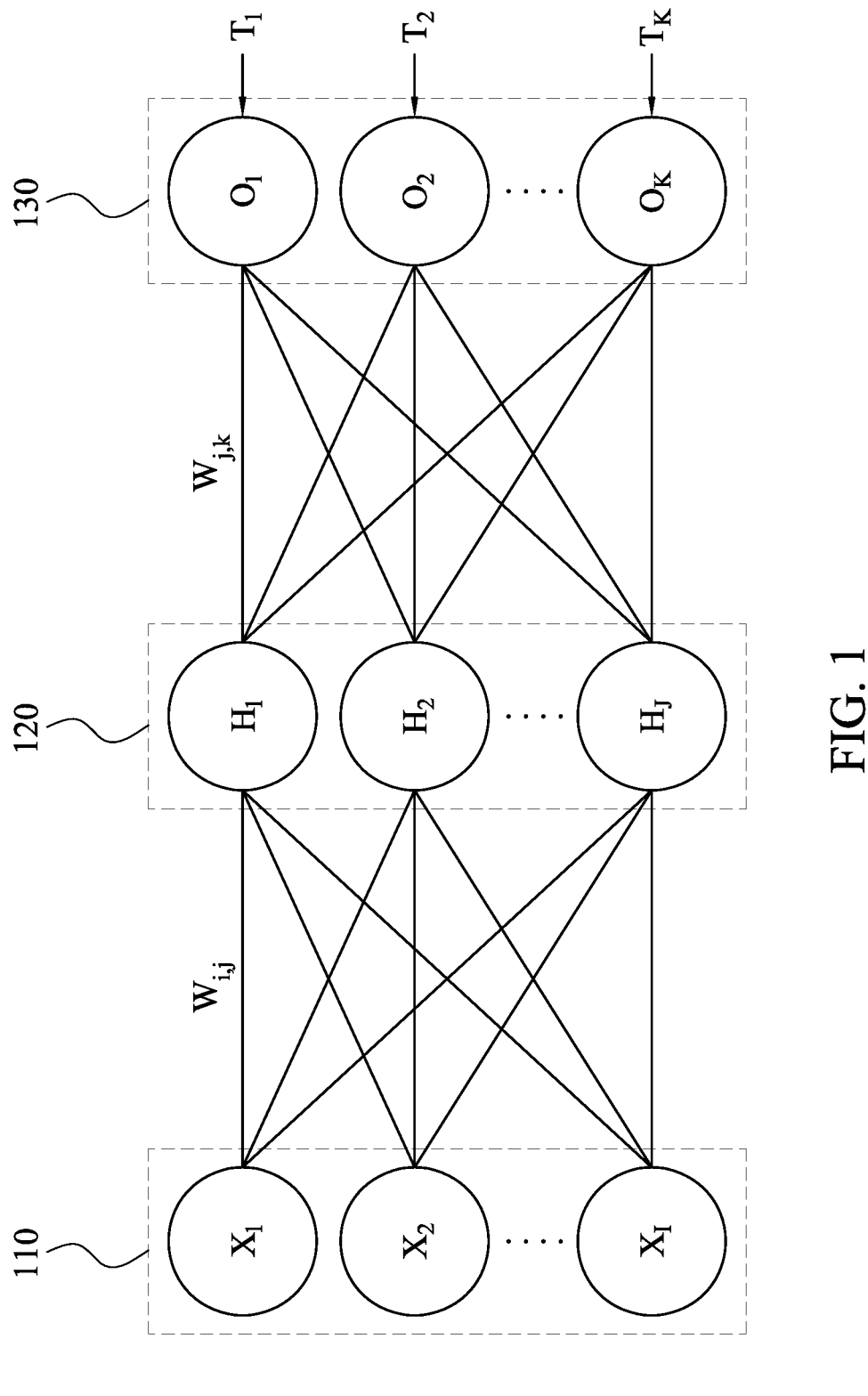
FIG. 1 is a diagram of perceptron network implemented in a hardware neural network device, in accordance with various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Reference is now made to FIG. 1. FIG. 1 is a diagram of perceptron network implemented in a hardware neural network device, in accordance with various embodiments of the present disclosure.

As illustratively shown in FIG. 1, the perceptron network 100 of the present disclosure includes an input neuron layer 110, a hidden neuron layer 120, and an output neuron layer 130. The input neuron layer 110 includes a plurality of neurons $X_1$-$X_J$, the hidden neuron layer 120 includes a plurality of neurons $H_1$-$H_J$, and the output neuron layer 130 includes a plurality of neurons $O_1$-$O_K$. In some embodiments, two adjacent neuron layers are referred to as pre-neuron and post-neuron layers along a forward propagation direction, and are fully connected to each other. For illustration, the neuron $X_1$ in the input neuron layer 110 is connected to each of the neurons $H_1$-$H_J$, the neuron $X_2$ in the input neuron layer 110 is also connected to each of the neurons and each of the rest neurons $X_3$-$X_J$ in the input neuron layer 110 is also connected to all of the neurons $H_1$-$H_J$. The above-mentioned connection manner is regarded as each one neuron $X_1$ being fully connected to the neurons $H_1$-$H_J$. In some embodiments, two adjacent neuron layers are fully connected using RRAM (Resistive Random Access Memory) synapses. The RRAM can be made of single-layer or combination of the following insulators, including, for example, TiOx, TaOx, HfOx, AlOx, ZrOx, WOx, NiO, which are sandwiched between two metal electrodes including, for example, TiN, TaN, Ti, Ta, Pt, Pd, Cu, Ag, Ni, Au, Hf, Zr, Al, W. In various embodiments, the insulator films can be deposited by, for example, physical vapor deposition (PVD), chemical vapor deposition (CVD), atomic layer deposition (ALD), thermal oxidation, or the like.

In some embodiments, the input neuron layer 110 and the hidden neuron layer 120 are two adjacent neuron layers, and input data are inputted from the input neuron layer 110 to the hidden neuron layer 120. The input data includes, for example, a symbol such as "8" or other handwritten numbers/characters, and the symbol is transformed into a binary number or other suitable digital type. Subsequently, the binary number is inputted into the neurons $X_1$-$X_I$ of the input neuron layer 110. The input neuron layer 110 and the hidden neuron layer 120 are fully connected with each other, and two connected neurons in the input neuron layer 110 and the hidden neuron layer 120 have a weight $W_{i,j}$. For instance, the neuron $X_1$ in the input neuron layer 110 and the neuron $H_1$ the hidden neuron layer 120 are connected to each other, and there is a weight $W_{1,1}$ between the neuron $X_1$ and the neuron $H_1$. Each of the neurons $H_1$-$H_J$ in the hidden neuron layer 120 receives products of every input data and the weight $W_{i,j}$, and the product is referred to as a weight sum in some embodiments.

In various embodiments, the hidden neuron layer 120 and the output neuron layer 130 are two adjacent neuron layers, and the input data are inputted from the hidden neuron layer 120 to the output neuron layer 130. The hidden neuron layer 120 and the output neuron layer 130 are fully connected with each other, and two connected neurons in the hidden neuron layer 120 and the output neuron layer 130 have a weight $W_{j,k}$. For instance, the neuron $H_2$ in the hidden neuron layer 120 and the neuron $O_2$ in the output neuron layer 130 are connected to each other, and there is a weight $W_{2,2}$ between the neuron $H_2$ and the neuron $O_2$. The weight sum from each of the neurons $H_1$-$H_J$ of the hidden neuron layer 120 is regarded as an input of the output neuron layer 130. Each of the neurons $O_1$-$O_K$ in the output neuron layer 130 receives products of every weight sum and the weight $W_{j,k}$.

As illustratively shown in FIG. 1, the weight sum outputted from each of the neurons $O_1$-$O_K$ of the output neuron layer 130 is regarded as an output of the perceptron network 100. The outputs from the neurons $O_1$-$O_K$ are compared with target values $T_1$-$T_K$, respectively. If one of the outputs from the neurons $O_1$-$O_K$ is different from the corresponding target value of the target values $T_1$-$T_K$, the weight $W_{i,j}$ between the input neuron layer 110 and the hidden neuron layer 120 and the weight $W_{j,k}$ between the hidden neuron layer 120 and the output neuron layer 130 are adjusted until the output and the corresponding target value are the same. In some embodiments, the target value is a predetermined value set to be corresponding to the input data, such that the weight between two adjacent neurons may be trained so as to find out the suitable weight value. In some embodiments, it is referred to as a supervised learning through repeatedly training the weight between two adjacent neuron layers, such that the output and the target are the same, so as to increase classification accuracy. Explained in a different way, the supervised learning is performed through repeatedly training the weight between two adjacent neuron layers, such that the input and the target are the same, so as to increase classification accuracy.

Figure 2A:
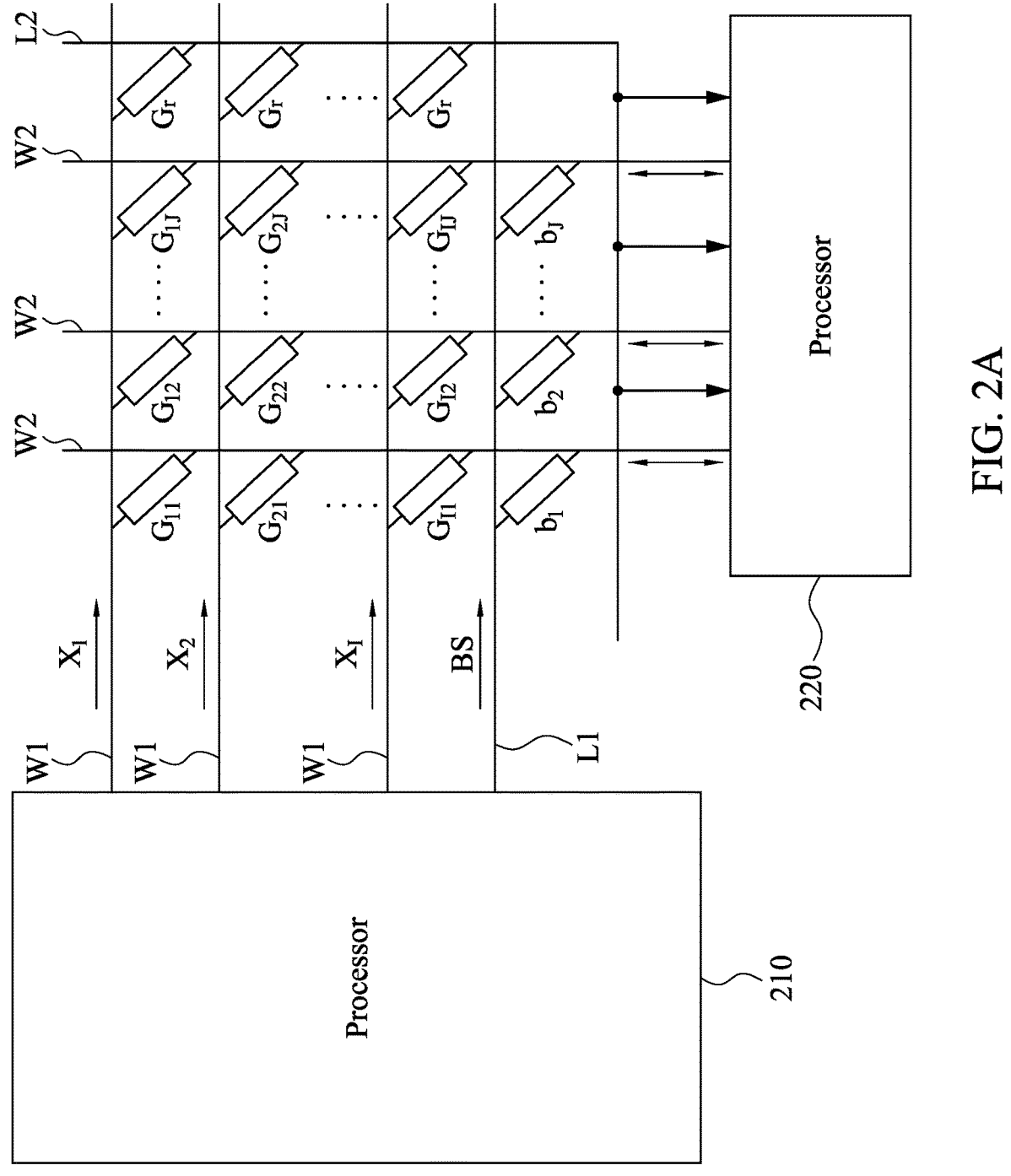
FIG. 2A is a diagram of a hardware neural network device including, for illustration, the perceptron network in FIG. 1, in accordance with various embodiments.

Reference is now made to FIG. 2A. FIG. 2A is a diagram of a hardware neural network device including, for illustration, the perceptron network 100 in FIG. 1, in accordance with various embodiments of the present disclosure.

In some embodiments, the perceptron network 100 in FIG. 1 is implemented by the hardware neural network (HNN) device as shown in FIG. 2A of the present disclosure. In some embodiments, the hardware neural network device in FIG. 2A illustrates the relationship between the input neuron layer 110 and the hidden neuron layer 120 of the perceptron network 100 in FIG. 1, which is elaborated in the following descriptions.

In some embodiments, the hardware neural network device in FIG. 2A includes a plurality of wires W1, a plurality of wires W2, a plurality of resistors $G_{11}$-$G_{IJ}$, a processor 210, and a processor 220. For simplicity of illustration, FIG. 2A illustrates only three wires W1 and three wires W2. Various numbers of the wires W1 and W2 are within the contemplated scope of the present disclosure.

As illustratively shown in FIG. 2A, the wires W1 are coupled to the processor 210, and the wires W2 are coupled to the processor 220. The wires W1 are arranged across the wires W2. Explained in a different way, each of the wires W1 and each of the wires W2 are intersected with each other, to form an array as illustratively shown in FIG. 2A. In various embodiments, each of the wires W1 and each of the wires W2 are not coupled to each other.

As illustratively shown in FIG. 2A, the direction of each of the wires W1 is perpendicular to the direction of each of the wires W2. In various embodiments, the wires W1 are parallel to each other, and the wires W2 are parallel to each other. In some embodiments, each of the resistors $G_{11}$-$G_{IJ}$ is correspondingly coupled to one of the wires W1 and one of the wires W2. For illustration, one terminal of the resistor $G_{11}$ is coupled to the upmost wire W1, and the other terminal of the resistor $G_{11}$ is coupled to the leftmost wire W2, as shown in FIG. 2A. In some embodiments, the wires W1 are coupled to the wires W2 by the resistors $G_{11}$-$G_{IJ}$, respectively. The configuration as illustratively shown in FIG. 2A is referred to as a crossbar array in some embodiments. In various embodiments, the fully connected hardware neural network device in FIG. 2A is implemented by, for illustration, a crossbar RRAM array.

In various embodiments, the wires W1 and the wires W2 are arranged to cross each other for forming an array. Each of the resistors located at the same column of the array has a first terminal and a second terminal. For illustration, the resistors $G_{11}$, $G_{21}$, . . . , $G_{I1}$ are located at the same column of the array, and each of the resistors $G_{11}$, $G_{21}$, . . . , $G_{I1}$ has a upper terminal and a lower terminal. As illustratively shown in FIG. 2A, the upper terminals of the resistors $G_{11}$, $G_{21}$, . . . , $G_{I1}$ are coupled to the wires W1, respectively, and the lower terminals of the resistors $G_{11}$, $G_{21}$, . . . , $G_{I1}$ are coupled to the same wire W2 located at the leftmost side.

As illustratively shown in FIG. 2A, the processor 210 is configured to provide input data through the wires W1. For illustration, the processor 210 provides input data $X_1$-$X_I$ through the wires W1 to the array as shown in FIG. 2A, and the processor 210 together with the wires W1 are therefore configured to implement the input neuron layer 110 in FIG. 1. The input data $X_1$-$X_I$ correspond to the neurons $X_1$-$X_I$, and are designated with the same reference numbers as the neurons $X_1$-$X_I$ as discussed above, for ease of understanding. The wires W2 are fully connected with the wires W1 via the resistors $G_{11}$-$G_{IJ}$. The input data from the wires W1 are thus transmitted to the wires W2 and then the processor 220 for calculating. As such, the wires W2 and the processor 220 are therefore configured to implement the hidden neuron layer 120 in FIG. 1. As mentioned above in FIG. 1, the two connected neurons in the input neuron layer 110 and the hidden neuron layer 120 have a weight $W_{i,j}$ therebetween, and such a weight is generated based on the input data transmitted through the resistors $G_{11}$-$G_{IJ}$ as illustratively shown in FIG. 2A, which will be explained in detail below.

In some embodiments, the weight values are both positive and negative numbers in the perceptron network 100 of FIG. 1. In such embodiments, a dummy wire (for illustration, a wire L2 as discussed below) is able to be introduced in the hardware neural network device of FIG. 2A, to provide a reference value for subtracting, such that negative numbers are able to be generated according to actual requirements, which is elaborated in the following descriptions.

In some embodiments, the hardware neural network device in FIG. 2A further includes a wire L1, a wire L2, a plurality of resistors $b_1$-$b_J$, and a plurality of reference resistors $G_r$. Each of the resistors $b_1$-$b_J$ is coupled to the wire L1 and corresponding one of the wires W2. For illustration, one terminal of the resistor $b_1$ is coupled to the leftmost wire W2, and the other terminal of the resistor $b_1$ is coupled to the wire L1. In addition, each of the reference resistors $G_r$ is coupled to the wire L2 and one of the wires W1. For illustration, one terminal of the upmost reference resistor $G_r$ is coupled to the upmost wire W1, and the other terminal of the upmost reference resistor $G_r$ is coupled to the wire L2. When the input data transmitted through the reference resistors $G_r$, reference values are generated and transmitted through the wire L2. With the foregoing configuration, the wire L2 provides the reference value for subtracting, such that negative numbers are generated. Based on the above, the perceptron network 100 of FIG. 1 can be implemented by the hardware neural network device of FIG. 2A.

Reference is now made to FIG. 3. FIG. 3 is an operation flow of the hardware neural network device as shown in FIG. 2A, in accordance with various embodiments of the present disclosure.

As illustratively shown in FIG. 3, in the operation 310, the input signals $X_1$-$X_I$ are transmitted from the wires W1 through the resistors $G_{11}$-$G_{IJ}$ to the wires W2, respectively, the input signals $X_1$-$X_I$ are transmitted from the wires W1 through the reference resistors $G_r$, respectively, to the wire L2, and a bias signal BS is transmitted from the wire L1 through the resistors $b_1$-$b_J$ to the wires W2.

In some embodiments, the input signals $X_1$-$X_I$ are voltage signals, and the processor 210 provides the voltage signals $X_1$-$X_I$ to input terminals of the wires W1. As illustratively shown in FIG. 2A, the input terminals of the wires W1 are leftmost terminals that are coupled to the processor 210, of the wires W1, and the processor 210 provides the voltage signals $X_1$-$X_I$ to the leftmost terminals of the wires W1. Subsequently, the voltage signals $X_1$-$X_I$ are transformed into current signals through the resistors $G_{11}$-$G_{IJ}$, and the current signals are transmitted to the wires W2. In some embodiments, the above-mentioned current signals indicate data including the weight sum values as discussed above, and the processor 220 receives the current signals to calculate the weight sum values.

As discussed above, weight $W_{i,j}$ is generated based on the input data transmitted through the resistors $G_{11}$-$G_{IJ}$ as illustratively shown in FIG. 2A. For illustration, the voltage signal $X_1$ is transmitted through the resistors $G_{11}$ and is transformed into a corresponding current signal, and this current signal is then transmitted for the processor 220 to calculate, in order to obtain the weight. Accordingly, the weight is generated based on the voltage signal $X_1$.

Correspondingly, the bias signal BS is a voltage signal in some embodiments, and the processor 210 provides the voltage signal BS to the input terminal of the wire L1. For illustration in FIG. 2A, the voltage signal BS is transformed into current signals through the resistors $b_1$-$b_J$, and the current signals are transmitted to the wires W2. In some embodiments, the above-mentioned current signals transformed from the bias signal BS indicate data including bias values, and the processor 220 receives the current signals to calculate the bias values.

In addition, the processor 210 provides the voltage signals $X_1$-$X_I$ to the input terminals of the wires W1. For illustration in FIG. 2A, the voltage signals $X_1$-$X_I$ are transformed into current signals through the resistors $G_r$, and the current signals are transmitted to the wire L2. In some embodiments, the above-mentioned current signals transformed from the resistors $G_r$ indicate data including reference value for subtracting, and the processor 220 receives the current signals to calculate the reference values.

As illustratively shown in FIG. 3, in the operation 320, the processor 220 is configured to receive, from one of the wires W2, a weight sum value corresponding to the input signals $X_1$-$X_I$ and a bias value corresponding to the bias signal BS, and receive, from the wire L2, a reference value corresponding to the input signals $X_1$-$X_I$. In some embodiments, the weight sum value is given by:

$$H_j = f_a\left(S_j^H\right) = f_a\left[b_j + \sum_{i=1}^{I}(X_i \times W_{ij})\right] \tag{1}$$

$$= f_a\left\{b_j + \sum_{i=1}^{I}[X_i \times (G_{ij} - G_r)]\right\} \tag{2}$$

As shown in formula (1) and (2), $f_a$ is a nonlinear activation function, and $X_i$ is the value of the input signal. $S_j^H$ is the weighted sum before activation. $b_j$ is the bias value. $W_{ij}$ is the weight value. $G_{ij}$ is a conductance value of one of the resistors $G_{11}$-$G_{IJ}$ in the hardware neural network device in FIG. 2A. The parameter $G_r$ in formula (2) will be described in the following discussions.

Figure 2B:
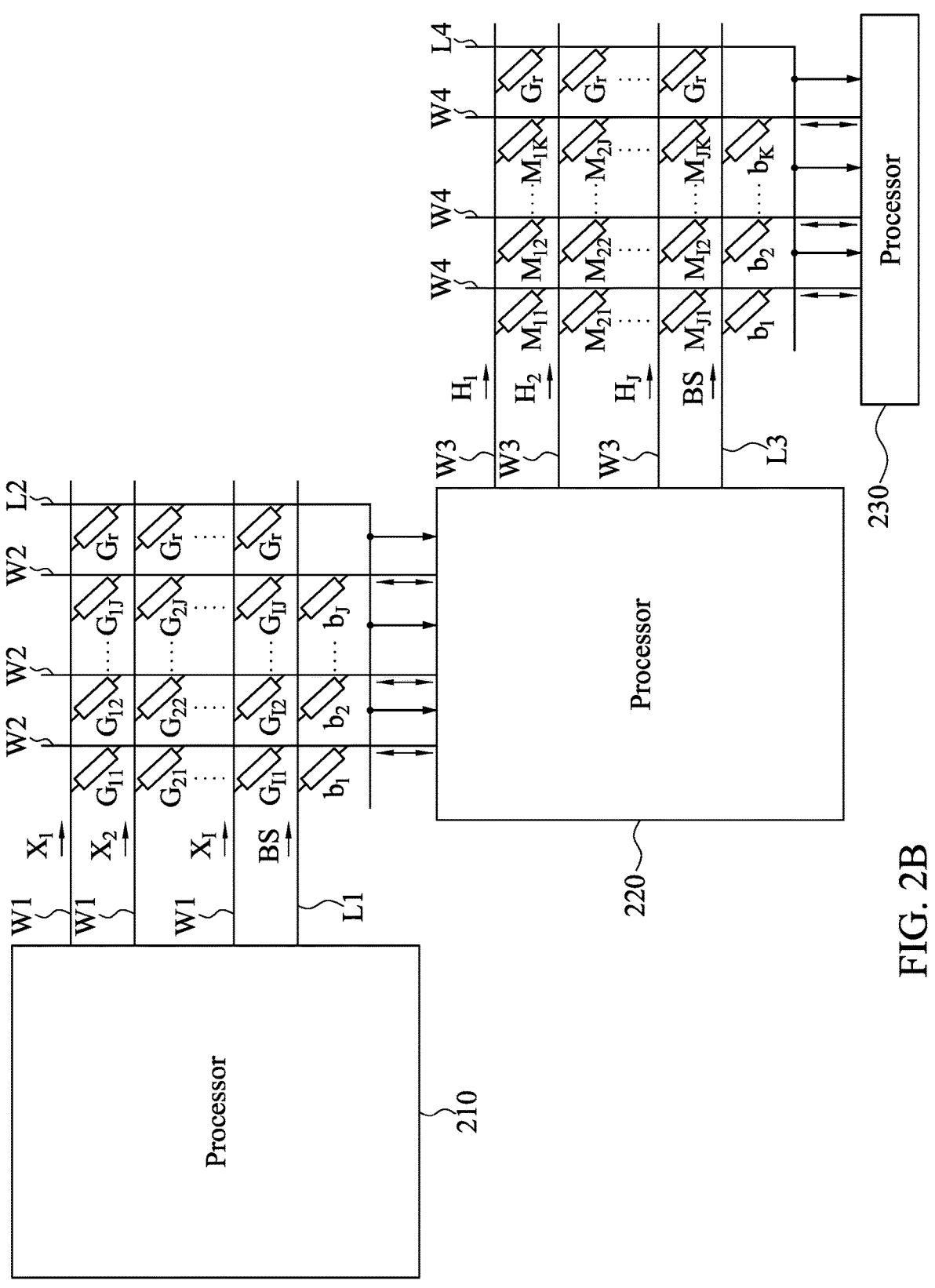
FIG. 2B is a diagram of a hardware neural network device including, for illustration, the perceptron network in FIG. 1, in accordance with various embodiments.

Reference is now made to FIG. 2B. FIG. 2B is a diagram of a hardware neural network device including, for illustration, the perceptron network 100 in FIG. 1, in accordance with various embodiments of the present disclosure.

As illustratively shown in FIG. 2B, the input neuron layer 110, the hidden neuron layer 120, and the output neuron layer 130 in FIG. 1 are implemented by the hardware neural network device in FIG. 2B. For illustration, the hardware neural network device in FIG. 2B shows a relationship between the input neuron layer 110 and the hidden neuron layer 120 and a relationship between the hidden neuron layer 120 and the output neuron layer 130. In some embodiments, the relationship between the input neuron layer 110 and the hidden neuron layer 120 is configured such that the input neuron layer 110 is the input neuron layer and the hidden neuron layer 120 is the output neuron layer. In some embodiments, the relationship between the hidden neuron layer 120 and the output neuron layer 130 is configured such that the hidden neuron layer 120 is the input neuron layer and the output neuron layer 130 is the output neuron layer.

In some embodiments, the hardware neural network device in FIG. 2B includes a plurality of wires W1, a plurality of wires W2, a plurality of wires W3, a plurality of wires W4, a plurality of resistors $M_{11}$-$M_{JK}$, a processor 210, a processor 220, and a processor 230. With respect to the embodiments of FIG. 2A, like elements in FIG. 2B are designated with the same reference for ease of understanding. The arrangement of the wires W1, the wires W2, the processor 210, and the processor 220 in FIG. 2B are similar to the arrangements of those elements in FIG. 2A, and thus details of such arrangements are therefore omitted herein for brevity. For simplicity of illustration, FIG. 2B illustrates only three wires W3 and three wires W4. Various numbers of the wires W3 and W4 are within the contemplated scope of the present disclosure.

As illustratively shown in FIG. 2B, the wires W3 are coupled to the processor 220, and the wires W4 are coupled to the processor 230. The wires W3 are arranged across the wires W4. Explained in a different way, each of the wires W3 and each of the wires W4 are intersected with each other, to form an additional array as illustratively shown in FIG. 2B. In various embodiments, each of the wires W3 and each of the wires W4 are not coupled to each other.

In various embodiments, the direction of each of the wires W3 is perpendicular to the direction of each of the wires W4. In various embodiments, the wires W3 are parallel to each other, and the wires W4 are parallel to each other. In some embodiments, each of the resistors $M_{11}$-$M_{JK}$ is correspondingly coupled to one of the wires W3 and one of the wires W4. For illustration, one terminal of the resistor Mu is coupled to the upmost wire W3 in the corresponding array, and the other terminal of the resistor $G_{11}$ is coupled to the leftmost wire W4 in the corresponding array, as shown in FIG. 2B. In some embodiments, the wires W3 are coupled to the wires W4 by the resistors $M_{11}$-$M_{JK}$, respectively. The configuration as illustratively shown in FIG. 2B is referred to as a crossbar array in some embodiments. In various embodiments, the fully connected hardware neural network device in FIG. 2B is implemented by, for illustration, a crossbar RRAM array.

As illustratively shown in FIG. 2B, the wires W3 and the wires W4 are arranged to cross each other for forming an array. Each of the resistors located at the same column of the array has a first terminal and a second terminal. For illustration, the resistors $M_{11}$, $M_{21}$, . . . , $M_{J1}$ located at the same column of the array, and each of the resistors $M_{11}$, $M_{21}$, . . . , $M_{J1}$ has a upper terminal and a lower terminal. As illustratively shown in FIG. 2B, the upper terminals of the resistors $M_{11}$, $M_{21}$, . . . , $M_{J1}$ are coupled to the wires W3, respectively, and the lower terminals of the resistors $M_{11}$, $M_{21}$, . . . , $M_{J1}$ are coupled to the same wire W4 located at the leftmost side.

In some embodiments, the processor 220 is configured to provide weight sums through the wires W3. For illustration, the processor 220 provides weight sums $H_1$-$H_J$ through the wires W3 to the additional array as shown in FIG. 2B, and the processor 220 together with the wires W3 are therefore configured to implement the hidden neuron layer 120 in FIG. 1. The wires W4 are fully connected with the wires W3 via the resistors $M_{11}$-$M_{JK}$. The weight sums $H_1$-$H_J$ from the wires W3 are thus transmitted to the wires W4 and then the processor 230 for calculating. As such, the wires W4 and the processor 230 are therefore configured to implement the output neuron layer 130 in FIG. 1. As mentioned above in FIG. 1, the two connected neurons in the hidden neuron layer 120 and the output neuron layer 130 have a weight $W_{j,k}$ therebetween, and such a weight is generated based on the weight sums transmitted through the resistors $M_{11}$-$M_{JK}$ as illustratively shown in FIG. 2B, as discussed above with respect to the embodiments in FIG. 2A. In various embodiments, the number of the hidden neuron layer 120 in FIG. 1 is plural. Therefore, in some embodiments, the number of the processor 220 and the wires W3 implement the hidden neuron layer 120 in FIG. 1 is plural as well, and the plural processors 220 and the plural wires W3 are cascaded to each other to form multilayer of the hidden neuron layer 120 in FIG. 1 according to actual requirements.

Reference is now made to both FIG. 1 and FIG. 2B, the processor 230 is configured to receive the weight sum from each of the neurons $H_1$-$H_J$ of the hidden neuron layer 120, and the weight sum values are given by:

$$O_k = f_a\left(S_k^0\right) = f_a\left[b_k + \sum_{j=1}^{J}(H_j \times W_{jk})\right]$$ (3)

-continued $$= f_a\left\{b_k + \sum_{i=1}^{I}[H_j \times (M_{jk} - G_r)]\right\}$$ (4)

As shown in formula (3) and (4), $f_a$ is a nonlinear activation function, and $H_j$ is the value of the input signal. $S_k^0$ is the weighted sum before activation. $b_k$ is the bias value. $W_{jk}$ is the weight value. $M_{jk}$ is a conductance value of the resistors in a hardware neural network device. The parameter $G_r$ in formula (4) will be described in the following discussions.

As shown in formula (2) and (4), $G_r$ is a reference value given by:

$$G_r = (G_{max} - G_{min})/2$$ (5)

As shown in formula (5), the conductance values of the resistors $G_{11}$-$G_{IJ}$ in the hardware neural network device of FIG. 2A are randomized in the range between a minimum resistor value $G_{min}$ and a maximum resistor value $G_{max}$. The reference value $G_r$ associated with the wire L2 is a value of the difference between the maximum resistor value $G_{max}$ and the minimum resistor value $G_{min}$ to be divided by two. Correspondingly, the conductance values of the resistors $M_{11}$-$M_{JK}$ in the hardware neural network device of FIG. 2B are randomized in the range between the minimum resistor value $G_{min}$ and the maximum resistor value $G_{max}$. The reference value $G_r$ associated with the wire L4 is a value of the difference between the maximum resistor value $G_{max}$ and the minimum resistor value $G_{min}$ to be divided by two. In some embodiments, the reference value $G_r$ associated with the wire L2 is different from the reference value $G_r$ associated with the wire L4. In some other embodiments, the reference value $G_r$ associated with the wire L2 is the same as the reference value $G_r$ associated with the wire L4.

As illustratively shown in FIG. 3, in the operation 330, the processor 220 is configured to shift the weight sum value by a nonlinear activation function to generate a shifted weight sum value. For illustration, after the weight sum value is calculated and obtained, the weight sum value is shifted by one of the following equations:

$$f_a(X) = \frac{1}{1 + e^{-(x-s)}}$$ (6)

$$f_a(X) = \max[0, (x - s)]$$ (7)

Figure 4:
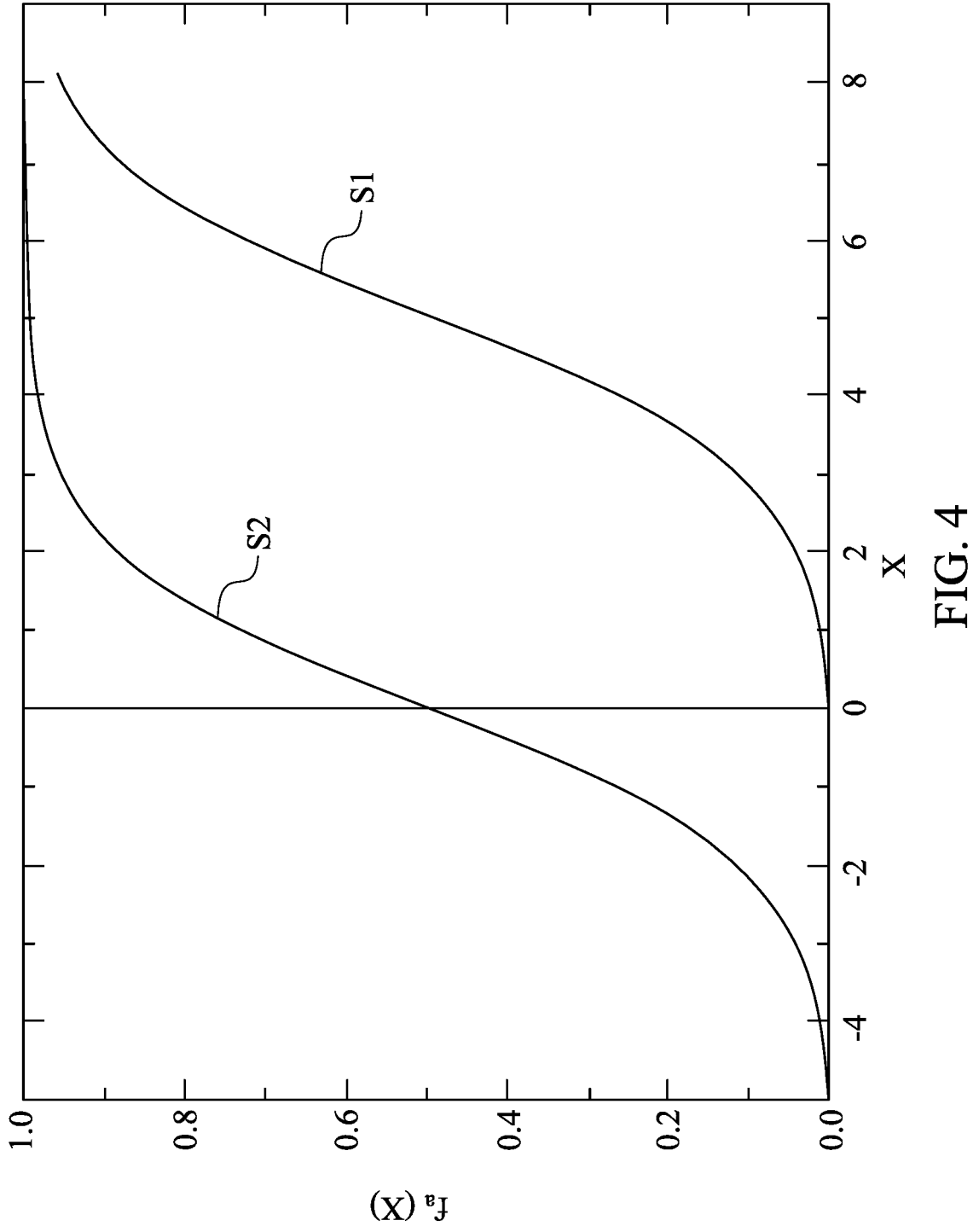
FIG. 4 is a diagram of a waveform of a nonlinear activation function, in accordance with various embodiments.

As shown in formula (6) and (7), s is a parallel shifted value of the functions. Reference is now made to FIG. 4. FIG. 4 is a diagram of a waveform of a nonlinear activation function, in accordance with various embodiments of the present disclosure. As illustratively shown in FIG. 4, the waveform S1 is a waveform of the formula (6) with shifting, and the waveform S2 is a waveform without shifting.

Figure 5:
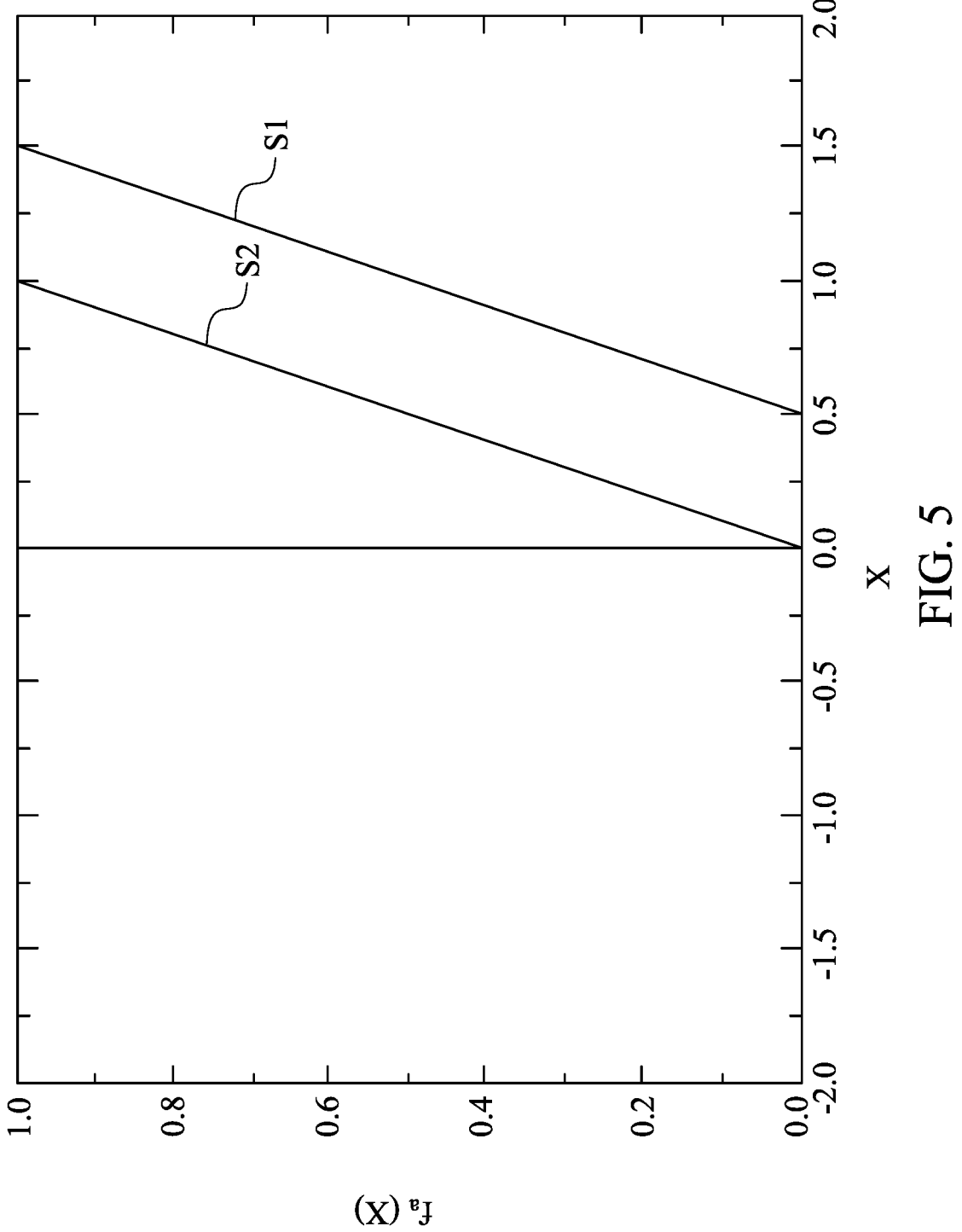
FIG. 5 is a diagram of a waveform of a nonlinear activation function, in accordance with various embodiments.

FIG. 5 is a diagram of a waveform of a nonlinear activation function, in accordance with various embodiments of the present disclosure. As illustratively shown in FIG. 5, the waveform S1 is a waveform of the formula (7) with shifting, and the waveform S2 is a waveform without shifting. In some embodiments, the activation function in the formula (6) is a sigmoid function. In various embodiments, the activation function in the formula (7) is a rectified linear unit (ReLU) function. The classification accuracy and the immunity to asymmetric nonlinearity of the hardware neural network device as shown in FIGS. 2A and 2B are improved by adopting the nonlinear activation function with shifting, which will be described in the following discussions.

As illustratively shown in FIG. 3, in the operation 340, the processor 220 is configured to calculate a backpropagation value based on the weight shifted sum value and a target value, and to generate a pulse number based on a corresponding input signal and the backpropagation value. Each of a value of the corresponding input signal and the backpropagation value is higher than or equal to a threshold value. As illustratively shown in FIG. 1, the backpropagation value is generated from the output neuron layer 130 and/or the hidden neuron layer 120 and is given by:

$$O_k^{BP} = (T_k - O_k) f_a'(S_k^O) \qquad (8)$$

$$H_j^{BP} = \sum_{k=1}^{K} (O_k^{BP} W_{jk}) f_a'(S_j^H) \qquad (9)$$

As shown in formula (8) and (9), $O_k^{BP}$ is the backpropagation value of the output. $T_k$ is the target value of each output neuron as discussed above in FIG. 1, $f_a$ is the derivative of the activation function, and $H_j^{BP}$ is the backpropagation value of the hidden neurons.

In some embodiments, in operation 340, the processor 230 calculates a backpropagation value $O_k^{BP}$ based on the difference between the target value $T_k$ and the output value $O_k$ as well as the weighted sum being calculated using derivative of activation, i.e., $f_a'(S_k^O)$. Substantially, the processor 220 calculates a backpropagation value $H_j^{BP}$ based on the sum of the backpropagation value $O_k^{BP}$ and the weight value $W_{jk}$ as well as the weighted sum being calculated using derivative of activation, i.e., $f_a'(S_j^H)$.

In addition, the pulse numbers applied on the resistors $G_{11}$-$G_{IJ}$, $M_{11}$-$M_{JK}$ are given by:

$$\Delta n_{ij} = \text{round}(X_i \times \eta H_j^{BP}) \qquad (10)$$

$$\Delta n_{jk} = \text{round}(H_i \times \eta O_k^{BP}) \qquad (11)$$

As shown in formula (10) and (11), $\eta$ is a learning rate that is a scaling factor to regulate training. Rounding is performed considering only an integer of the effective pulse number. Positive and negative $\Delta n$ induce potentiation and depression of the device conductance, respectively.

As illustratively shown in FIG. 3, in the operation 350, the processor 220 is configured to apply a voltage pulse to one of the resistors $G_{11}$-$M_{JK}$ related to the corresponding input signal based on the pulse number. In some embodiments, one corresponding resistor of the resistors $G_{11}$-$M_{JK}$ has a new conductance value $G^{new}$ when the voltage pulse is applied thereto. In some embodiments, the new conductance value $G^{new}$ generated by applying the voltage pulse to corresponding one of the resistors $G_{11}$-$M_{JK}$ is given by:

$$G^{new} = G_P(n_P^{old} \times \Delta n) \qquad (12)$$

$$= G_D(n_D^{old} \times \Delta n) \qquad (13)$$

As shown above in formula (12) and (13), $$n_P^{old}$$

is a cumulative number of potentiation pulse corresponding to the potentiation of the device conductance as discussed above, which is applied to the corresponding resistor, before the weight is updated.

$$n_D^{old}$$

is a cumulative number of depression pulse corresponding to the depression of the device conductance as discussed above, which is applied to the corresponding resistor, before the weight is updated.

As illustratively shown in FIG. 1, if the output of the neuron $O_1$ is different from the target value $T_1$, the weight $W_{j,k}$ is to be adjusted. As described above, the weight $W_{j,k}$ is generated based on the input signals, including, for illustration, the weight sums $H_1$-$H_J$ that are transmitted through the resistors $M_{11}$-$M_{JK}$ in FIG. 2B. Accordingly, the weight $W_{j,k}$ can be adjusted by changing the conductance of the resistors $M_{11}$-$M_{JK}$ in FIG. 2B. The way of changing the conductance of the resistors $M_{11}$-$M_{JK}$ in FIG. 2B is achieved by providing corresponding voltage pulses. Alternatively stated, a voltage pulse is calculated and applied to the corresponding resistor $M_{JK}$ based on the pulse number, such that the weight $W_{j,k}$ is adjusted.

Reference is now made to FIG. 1. For illustration, when the output of the neuron $O_1$ is different from the target value $T_1$, not only the weight $W_{j,k}$ is to be adjusted, but the weight $W_{i,j}$ is also to be adjusted. Therefore, a voltage pulse is calculated and applied to the resistor $G_{11}$-$G_{IJ}$ related to the target value $T_1$ based on the pulse number, such that the weight $W_{i,j}$ and the weight $W_{j,k}$ can be adjusted, so as to adjust the output of the neuron $O_1$ to be the same as the target value $T_1$.

Figure 6:
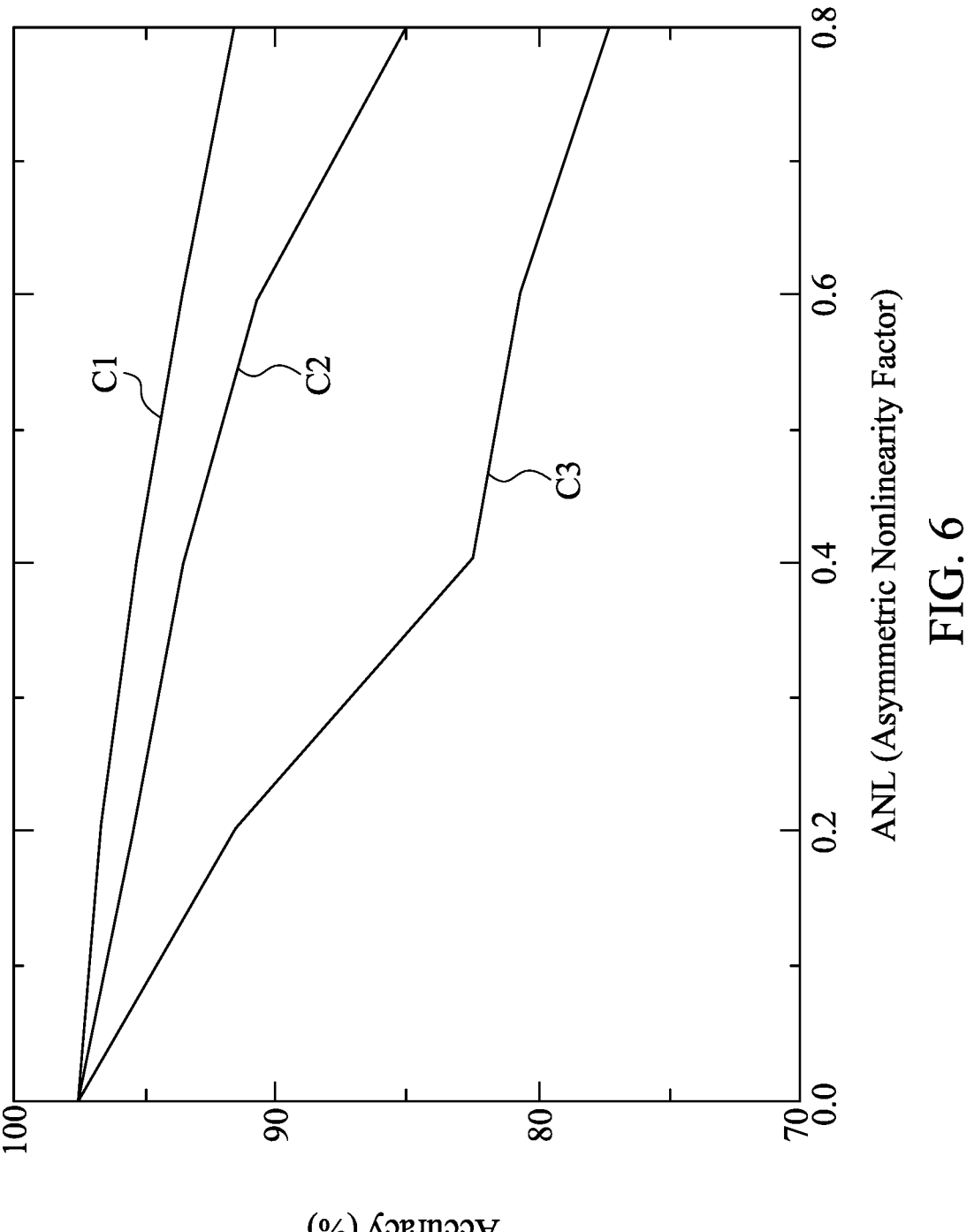
FIG. 6 is a diagram of an experimental data chart of the hardware neural network device in FIGS. 2A, 2B, in accordance with various embodiments.

Reference is now made to FIG. 6. FIG. 6 is a diagram of an experimental data chart of the hardware neural network device as shown in FIGS. 2A and 2B, in accordance with various embodiments of the present disclosure.

As illustratively shown in FIG. 6, the curve C1 relates to an experimental data chart adopting an activation function with shifting, and the curve C2 relates to an experimental data chart adopting an activation function with shifting. For illustration, the activation function adopted for the curve C1 is different from the activation function adopted for the curve C2. In some embodiments, the activation function adopted for the curve C1 is, for illustration, a sigmoid function. In various embodiments, the activation function adopted for the curve C2 is, for illustration, a ReLU function. The curve C3 relates to an experimental data chart adopting an activation function without shifting. As illustratively shown in FIG. 6, it is clear that the accuracy of each of the curve C1 and the curve C2 is higher than that of the curve C3. As discussed above, the wires W2 and the processor 220 are configured to implement the hidden neuron layer 120 in FIG. 1. In some embodiments, the processor 220 is configured to receive and shift the weight sum value by a nonlinear activation function from the wire W2 to generate a shifted weight sum value. The configuration as illustratively shown in FIG. 2A adopts a nonlinear activation function with shifting the weight sum value, and the accuracy of experimental data chart is therefore improved. Accordingly, adopting an activation function with shifting improves the immunity to asymmetric nonlinearity.

Figure 7:
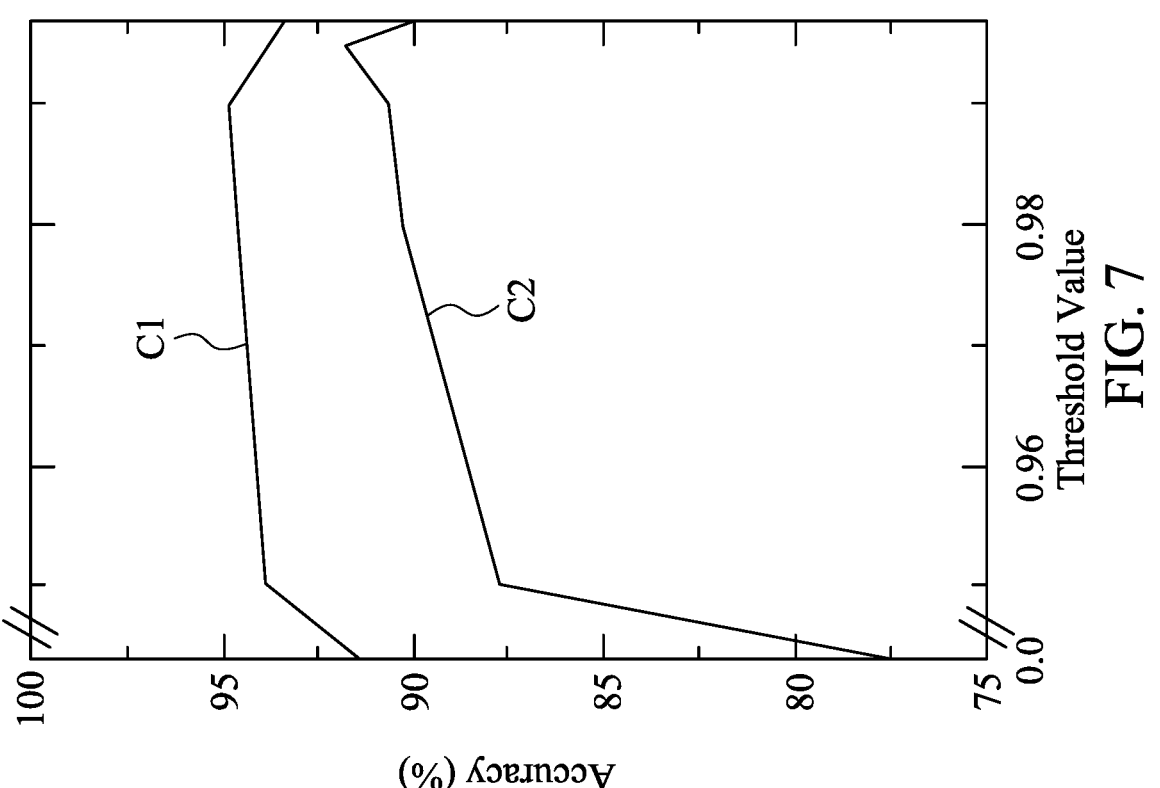
FIG. 7 is a diagram of an experimental data chart of the hardware neural network device in FIGS. 2A, 2B, in accordance with various embodiments.

Reference is now made to FIG. 7. FIG. 7 is a diagram of an experimental data chart of the hardware neural network device in FIGS. 2A and 2B, in accordance with various embodiments of the present disclosure.

According to the experiment results, if the input signal and the feedback are higher than a threshold value, the accuracy is improved. The threshold value is set to be compared with the input signal and the feedback, and the input signal and the feedback will be adopted if they are higher than the threshold value. As illustratively shown in FIG. 7, the curve C1 relates to an experimental data chart adopting the threshold value, and the curve C2 relates to an experimental data chart which does not adopt the threshold value. As illustrated in FIG. 7, it is clear that the accuracy of the curve C1 is higher than that of the curve C2. Accordingly, adopting the threshold value improves the immunity to asymmetric nonlinearity. In some embodiments, the activation function adopted in the embodiments in FIG. 7 is, for illustration, a sigmoid function.

Figure 8:
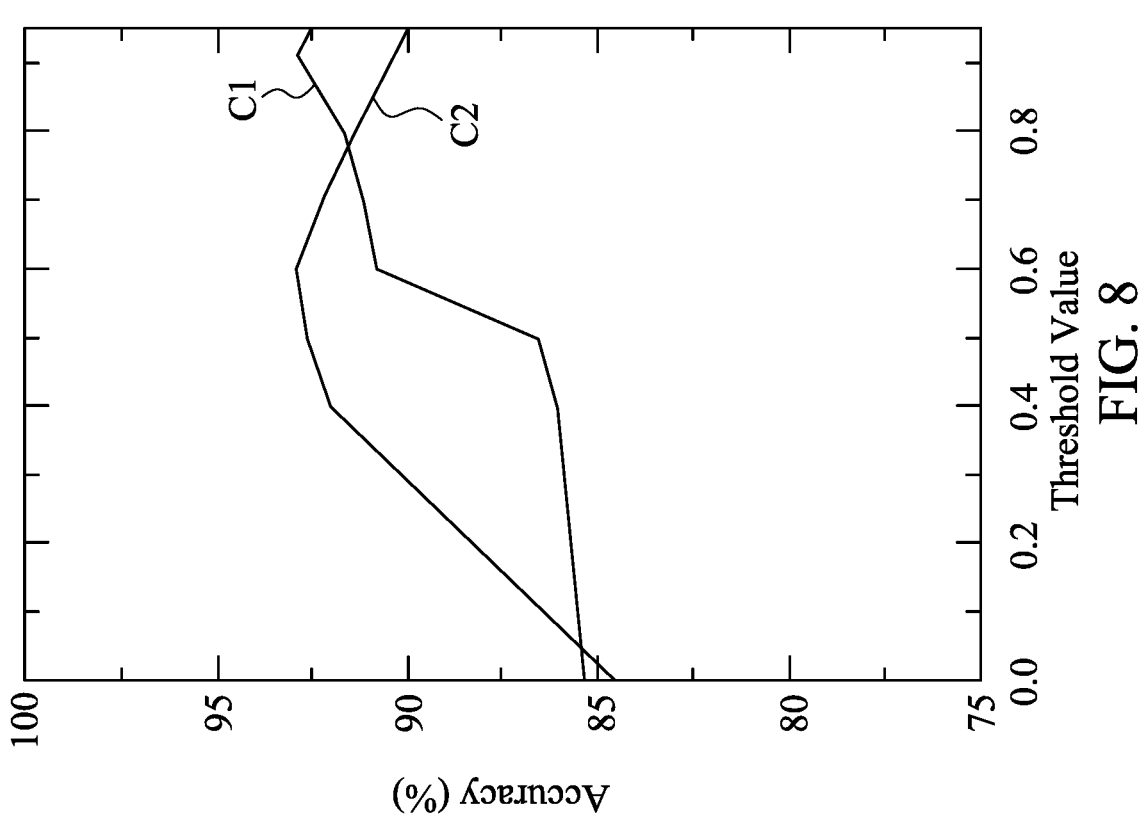
FIG. 8 is a diagram of an experimental data chart of the hardware neural network device in FIGS. 2A, 2B, in accordance with various embodiments.

Reference is now made to FIG. 8. FIG. 8 is a diagram of an experimental data chart of the hardware neural network device in FIGS. 2A and 2B, in accordance with various embodiments of the present disclosure.

Correspondingly, according to the experiment results, if the input signal and the feedback are higher than a threshold value, the accuracy is improved. The threshold value is set to be compared with the input signal and the feedback, and the input signal and the feedback will be adopted if they are higher than the threshold value. As illustratively shown in FIG. 8, the curve C1 relates to an experimental data chart adopting the threshold value, and the curve C2 relates to an experimental data chart that does not adopt the threshold value. As illustrated in FIG. 8, it is clear that the accuracy of the curve C1 is higher than that of the curve C2. Accordingly, adopting the threshold value improves the immunity to asymmetric nonlinearity. In some embodiments, the activation function adopted in the embodiment in FIG. 8 is, for illustration, a ReLU function.

Figure 9:
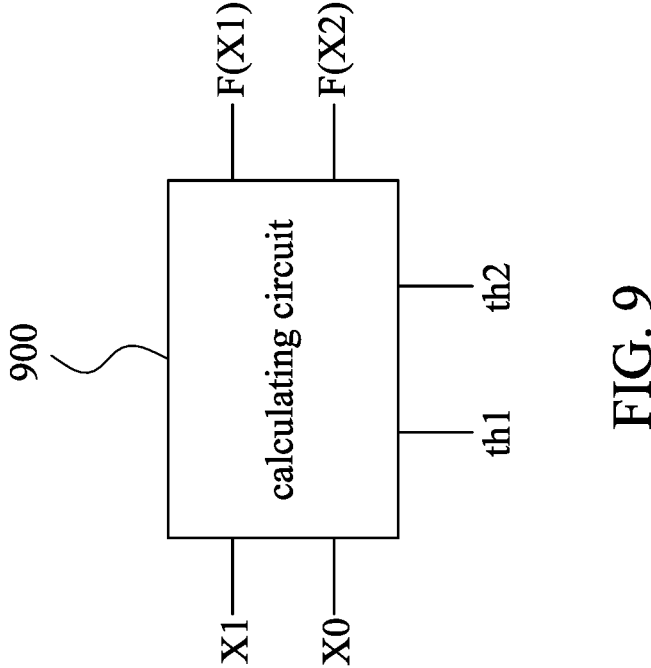
FIG. 9 is a diagram of a calculating circuit for implementing at least a portion of the processor in FIG. 2A or FIG. 2B in accordance with various embodiments.

FIG. 9 is a diagram of a calculating circuit for implementing at least a portion of the processor in FIG. 2A or FIG. 2B, in accordance with various embodiments. For illustration in FIG. 9, the calculating circuit 900 is, for example, a 2-bit calculating circuit. The calculating circuit 900 is configured to receive 2-bit input data X1, X0 and threshold values th1, th2, and to calculate the input data X1, X0 with the threshold values th1, th2 to generate output data F(x1), F(x2). In some embodiments, the calculating circuit 900 is implemented by a digital circuit.

In some embodiments, a truth table implemented by the calculating circuit 900 is shown below. For convenience of illustration, values of the input data X1, X0 shown in the below truth table are referred to as (X1, X0), the threshold values th1, th2 shown in the below truth table are referred to as (th1, th2), and values of the output data F(x1), F(x2) shown in the below truth table are referred to as (F(x1), F(x2)).

|    | x1 | x0 | th1 | th2 | F(x1) | F(x2) |
|----|----|----|-----|-----|-------|-------|
| 1  | 0  | 0  | 0   | 0   | 0     | 0     |
| 2  | 0  | 1  | 0   | 0   | 0     | 1     |
| 3  | 1  | 0  | 0   | 0   | 1     | 0     |
| 4  | 1  | 1  | 0   | 0   | 1     | 1     |
| 5  | 0  | 0  | 0   | 1   | 0     | 0     |
| 6  | 0  | 1  | 0   | 1   | 0     | 1     |
| 7  | 1  | 0  | 0   | 1   | 1     | 0     |
| 8  | 1  | 1  | 0   | 1   | 1     | 1     |
| 9  | 0  | 0  | 1   | 0   | 0     | 0     |
| 10 | 0  | 1  | 1   | 0   | 0     | 0     |

-continued

|    | x1 | x0 | th1 | th2 | F(x1) | F(x2) |
|----|----|----|-----|-----|-------|-------|
| 11 | 1  | 0  | 1   | 0   | 1     | 0     |
| 12 | 1  | 1  | 1   | 0   | 1     | 1     |
| 13 | 0  | 0  | 1   | 1   | 0     | 0     |
| 14 | 0  | 1  | 1   | 1   | 0     | 0     |
| 15 | 1  | 0  | 1   | 1   | 0     | 0     |
| 16 | 1  | 1  | 1   | 1   | 1     | 1     |

For example, as illustrated in the above mentioned truth table, the input data X1, X0 in item 3 are (1, 0), and the threshold values th1, th2 set in item 3 are (0, 0). Because the bit value of the input data (1, 0) is larger than the bit value of the threshold values (0,0) in item 3, the output data F(x1), F(x2) in item 3 are also (1, 0). For another example, referring to item 10, the input data X1, X0 are (0, 1), and the threshold values set in item 10 are (1, 0). Because the bit value of the input data X1, X0 (0,1) is smaller than the bit value of the threshold values (1, 0) in item 10, the input data X1, X0 (0, 1) is blocked by the calculating circuit 900, such that the output data F(x1), F(x2) in item 10 are (0, 0). Alternatively stated, the input data X1, X0 (0, 1) having values that are smaller than the threshold values th1, th2 are filtered out by the calculating circuit 900 in some embodiments, in order to generate corresponding output data F(x1), F(x2). Other output data F(x1), F(x2) in the above truth table are calculated in the same manner. The rest of output data F(x1), F(x2) may be deduced by analogy, and thus detailed descriptions regarding the calculations are omitted herein.

In some embodiments, the formula implemented in the calculating circuit 900 is given by:

$$F(x1)=x1x0+x1\mathrm{bar}(th1)+x1\mathrm{bar}(th2) \tag{14}$$

$$F(x2)=x1x0+x0\mathrm{bar}(th1) \tag{15}$$

Figure 10:
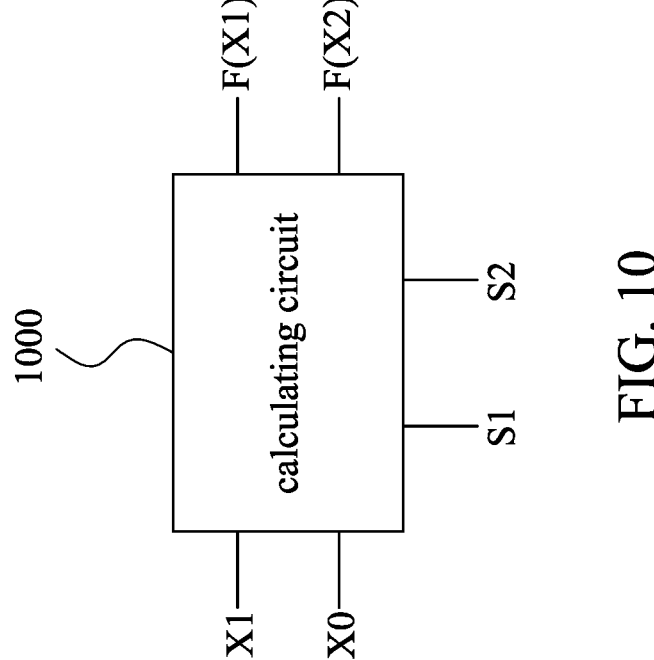
FIG. 10 is a diagram of a calculating circuit for implementing at least a portion of the processor in FIG. 2A or FIG. 2B in accordance with various embodiments.

FIG. 10 is a diagram of a calculating circuit for implementing for implementing at least a portion of the processor in FIG. 2A or FIG. 2B, in accordance with various embodiments. For illustration in FIG. 10, the calculating circuit 1000 is, for example, a 2-bit calculating circuit. The calculating circuit 1000 is configured to receive 2-bit input data X1, X0 and shifted values s1, s2, and to calculate the input data X1, X0 with the shifted values s1, s2 to generate output data F(x1), F(x2). In some embodiments, the calculating circuit 1000 is implemented by a digital circuit.

In some embodiments, a truth table implemented by the calculating circuit 900 is shown below. For convenience of illustration, values of the input data X1, X0 shown in the below truth table are referred to as (X1, X0), the shifted values s1, s2 shown in the below truth table are referred to as (s1, s2), and values of the output data F(x1), F(x2) shown in the below truth table are referred to as (F(x1), F(x2)).

|    | x1 | x0 | s1 | s2 | F(x1) | F(x2) |
|----|----|----|----|----|-------|-------|
| 1  | 0  | 0  | 0  | 0  | 0     | 0     |
| 2  | 0  | 1  | 0  | 0  | 0     | 1     |
| 3  | 1  | 0  | 0  | 0  | 1     | 0     |
| 4  | 1  | 1  | 0  | 0  | 1     | 1     |
| 5  | 0  | 0  | 0  | 1  | 0     | 0     |
| 6  | 0  | 1  | 0  | 1  | 0     | 0     |
| 7  | 1  | 0  | 0  | 1  | 0     | 1     |
| 8  | 1  | 1  | 0  | 1  | 1     | 0     |
| 9  | 0  | 0  | 1  | 0  | 0     | 0     |
| 10 | 0  | 1  | 1  | 0  | 0     | 0     |
| 11 | 1  | 0  | 1  | 0  | 0     | 0     |
| 12 | 1  | 1  | 1  | 0  | 0     | 1     |

-continued

|    | x1 | x0 | s1 | s2 | F(x1) | F(x2) |
|----|----|----|----|----|-------|-------|
| 13 | 0  | 0  | 1  | 1  | 0     | 0     |
| 14 | 0  | 1  | 1  | 1  | 0     | 0     |
| 15 | 1  | 0  | 1  | 1  | 0     | 0     |
| 16 | 1  | 1  | 1  | 1  | 0     | 0     |

For example, as illustrated in the above-mentioned truth table, the input data X1, X0 in item 3 are (1, 0), and the shifted values s1, s2 set in item 3 are (0, 0) which indicates no shift. Accordingly, the input data X1, X0 are not shifted in item 3, and the output data F(x1), F(x2) in item 3 are therefore (1, 0) as same as the input data X1, X0. In item 10, the input data X1, X0 are (0, 1), and the shifted values s1, s2 set in item 10 are (1, 0). Because the bit value of the input data (0, 1) is smaller than the shifted values (1, 0) and is shifted therewith, the bit value of the input data (0, 1) is shifted more than the bit value of the input data (0, 1) itself. Accordingly, the output data F(x1), F(x2) in item 10 become (0, 0). Alternatively stated, the input data X1, X0 (0, 1) are shifted based on the shifted values s1, s2 by the calculating circuit 1000 in some embodiments, in order to generate corresponding output data F(x1), F(x2). Other output data F(x1), F(x2) in the above truth table are calculated in the same manner. The rest of output data F(x1), F(x2) may be deduced by analogy, and thus detailed descriptions regarding the calculations are omitted herein.

In some embodiments, the formula of the calculating circuit 1000 is given by:

$$F(x1)=x1\text{bar}(s1)\text{bar}(s2)+x1x0\text{bar}(s1) \quad (16)$$

$$F(x2)=x0\text{bar}(s1)\text{bar}(s2)+x1x0\text{bar}(s1)+x1\text{bar}(x0)\text{bar}(s2)s1 \quad (17)$$

Also disclosed is a method that includes: generating a first sum value at least by a first resistor; generating a first shifted sum value based on the first sum value and a nonlinear function; generating a pulse number based on the first shifted sum value; and changing the first resistor based on the pulse number to adjust the first sum value.

Also disclosed is a method that includes: shifting a sum value to generate a shifted sum value; generating a first pulse number based on the shifted sum value and a target value; and adjusting a first resistor related to the sum value based on the first pulse number, until the shifted sum value and the target value are the same.

Also disclosed is a method that includes: generating a first sum value at least by a first resistor; generating a second sum value based on the first sum value at least by a second resistor; generating a first feedback and a second feedback based on the second sum value; adjusting the second resistor based on the first feedback; and adjusting the first resistor based on the second feedback.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
generating a first sum value by a plurality of first resistors, wherein the plurality of first resistors comprise a plurality of weight resistors and a plurality of reference resistors, wherein a reference value of the plurality of reference resistors is a difference between a maximum weight resistor value and a minimum weight resistor value to be divided by two;
generating a first shifted sum value based on the first sum value and a nonlinear function;
calculating a first backpropagation value based on the first shifted sum value;
generating a pulse number based on the first backpropagation value;
changing one of the plurality of weight resistors based on the pulse number to adjust the first sum value,
calculating a second backpropagation value based on the first backpropagation value and a weight value associated with a second resistor; and
adjusting the second resistor based on the second backpropagation value.

2. The method of claim 1, wherein generating the first sum value comprises generating the first sum value by the plurality of weight resistors having conductance values in a range between the maximum weight resistor value and the minimum weight resistor value, and
generating the first shifted sum value comprises generating the first shifted sum value according to the maximum weight resistor value and the minimum weight resistor value.

3. The method of claim 1, wherein the nonlinear function is a sigmoid function or a rectified linear unit function.

4. The method of claim 1, wherein generating the pulse number comprises generating the pulse number based on the second backpropagation value.

5. The method of claim 4, wherein changing the one of the plurality of weight resistors comprises changing the one of the plurality of weight resistors until the first shifted sum value is substantially equal to a target value, and
generating the first backpropagation value comprises generating the first backpropagation value based on the target value.

6. The method of claim 4, wherein generating the pulse number comprises generating the second backpropagation value based on a derivative of the nonlinear function.

7. The method of claim 4, wherein
generating the first sum value comprises transmitting a first input signal through the one of the plurality of weight resistors, and
generating the pulse number comprises generating the pulse number when each of a value of the first input signal and the first backpropagation value is higher than or equal to a threshold value.

8. The method of claim 7, wherein the pulse number is increased when the first input signal is increased.

9. A method, comprising:
generating a nonlinear function according to each of a plurality of input signals and a shift value, wherein the plurality of input signals are transmitted to a plurality of first resistors, wherein the plurality of first resistors comprise a plurality of weight resistors and a plurality of reference resistors, wherein a reference value of the plurality of reference resistors is a difference between a maximum weight resistor value and a minimum weight resistor value to be divided by two;

shifting a sum value of the plurality of input signals to generate a shifted sum value by the nonlinear function;

generating a first pulse number based on the shifted sum value and a target value; and adjusting one of the plurality of weight resistors related to the sum value based on the first pulse number, until the shifted sum value and the target value are the same.

10. The method of claim 9, further comprising:

generating a second pulse number based on the shifted sum value and the target value; and adjusting a second resistor related to the shifted sum value based on the second pulse number, until the shifted sum value and the target value are the same.

11. The method of claim 10, further comprising:

generating a first backpropagation value based on a difference between the target value and the shifted sum value; and generating a second backpropagation value based on the first backpropagation value and the second resistor, wherein generating the first pulse number comprises generating the first pulse number based on the second backpropagation value, and generating the second pulse number comprises generating the second pulse number based on the first backpropagation value.

12. The method of claim 10, further comprising:

receiving a first input signal by the one of the plurality of weight resistors to generate the sum value; and receiving a second input signal corresponding to the sum value by the second resistor to generate the shifted sum value.

13. The method of claim 12, wherein the first pulse number is increased when a value of the first input signal is increased, and the second pulse number is increased when a value of the second input signal is increased.

14. The method of claim 9, further comprising:

generating the sum value based on the nonlinear function; and generating the shifted sum value based on the nonlinear function.

15. The method of claim 9, further comprising:

generating the sum value based on the difference between the maximum weight resistor value and the minimum weight resistor value, wherein a conductance value of the one of the plurality of weight resistors is between the maximum weight resistor value and the minimum weight resistor value.

16. A method, comprising:

generating a first sum value by a plurality of first resistors, wherein the plurality of first resistors comprise a plurality of weight resistors and a plurality of reference resistors, wherein a reference value of the plurality of reference resistors is a difference between a maximum weight resistor value and a minimum weight resistor value to be divided by two;

generating a second sum value based on the first sum value at least by a second resistor;

generating a first feedback and a second feedback based on the second sum value;

adjusting the second resistor based on the first feedback; and adjusting one of the plurality of weight resistors based on the second feedback, wherein the second feedback is proportional to and different from the first feedback.

17. The method of claim 16, wherein generating the first feedback and the second feedback comprises generating each of the first feedback and the second feedback based on a function, adjusting the second resistor comprises adjusting the second resistor based on a derivative of the function, and adjusting the one of the plurality of weight resistors comprises adjusting the one of the plurality of weight resistors based on the derivative of the function.

18. The method of claim 16, wherein generating the second feedback comprises:

generating the second feedback based on the first feedback and a weight value associated with the second resistor.

19. The method of claim 18, wherein adjusting the second resistor comprises:

applying at least one pulse to the second resistor, wherein a number of the at least one pulse is increased when one of the second feedback and the first sum value is increased.

20. The method of claim 19, wherein the second feedback is decreased when the second sum value approaches a target value.

* * * * *